(12) United States Patent
Enomoto

(10) Patent No.: US 7,221,394 B2
(45) Date of Patent: May 22, 2007

(54) DIGITAL CAMERA

(75) Inventor: Shigeo Enomoto, Tokyo (JP)

(73) Assignee: PENTAX Corporation, Tokyo (JP)

( * ) Notice: Subject to any disclaimer, the term of this patent is extended or adjusted under 35 U.S.C. 154(b) by 830 days.

(21) Appl. No.: 10/644,752

(22) Filed: Aug. 21, 2003

(65) Prior Publication Data
US 2004/0036781 A1 Feb. 26, 2004

(30) Foreign Application Priority Data
Aug. 23, 2002 (JP) .................... P2002-243664

(51) Int. Cl.
*H04N 5/228* (2006.01)
(52) U.S. Cl. .................. 348/229.1; 348/229.1; 348/297
(58) Field of Classification Search ............ 348/229.1, 348/296, 297, 360, 362, 363, 230.1, 222.1
See application file for complete search history.

(56) References Cited

U.S. PATENT DOCUMENTS

| | | | |
|---|---|---|---|
| 4,978,981 A | 12/1990 | Satoh et al. | 396/63 |
| 5,170,205 A | 12/1992 | Satoh et al. | 396/52 |
| 5,610,654 A | 3/1997 | Parulski et al. | 348/229.1 |
| 5,978,610 A | 11/1999 | Aoki | 396/429 |
| 6,473,126 B1 * | 10/2002 | Higashihara et al. | 348/345 |
| 6,603,508 B1 | 8/2003 | Hata | 348/229.1 |
| 6,778,210 B1 * | 8/2004 | Sugahara et al. | 348/208.4 |
| 2004/0021783 A1 * | 2/2004 | Mihara | 348/240.99 |

FOREIGN PATENT DOCUMENTS

| | | |
|---|---|---|
| JP | 200 3-114457 | 4/2003 |
| JP | 200 3-224762 | 8/2003 |

OTHER PUBLICATIONS

English Language Abstract of JP 2003-114457.

* cited by examiner

*Primary Examiner*—David Ometz
*Assistant Examiner*—Pritham D. Prabhakher
(74) *Attorney, Agent, or Firm*—Greenblum & Bernstein, P.L.C.

(57) ABSTRACT

A digital camera comprises a solid state imaging device provided with an optical low-pass filter. A photographing optical system forms an object image on a light receiving surface of a CCD through the optical low-pass filter. An electronic-charge accumulation-time control program is stored in a ROM of a system control circuit to determine optimum exposure parameters according to which a photography is performed. The electronic-charge accumulation-time control program has a program diagram showing a relationship between an electronic-charge accumulation-time and an aperture value and/or an ISO speed.

5 Claims, 7 Drawing Sheets

DIGITAL CAMERA

BACKGROUND OF THE INVENTION

1. Field of the Invention

The present invention relates to a digital camera which is provided with a solid state imaging device, and more particularly to a digital camera in which an electronic-charge accumulation-time control program for obtaining a proper exposure is installed.

2. Description of the Related Art

Conventionally, there is known a 35 mm film camera (i.e., a Leica-size film camera) in which a shutter speed program is installed in order to obtain a proper exposure. When designing the shutter speed program, it is necessary to set a camera-shake limit shutter speed, i.e., a minimum shutter speed value to counteract the effects of a camera-shake. The camera-shake limit shutter speed is determined as follows.

First, in a 35 mm film camera, a permissible unsharpness, occurring because of being out-of-focus, is the diameter of the minimum circle of confusion (=60 μm), in accordance with the JIS standard relating to the depth of field. On the other hand, a permissible image blur, occurring because of a camera-shake, is not regulated, and is usually set at the same level as the diameter of the minimum circle of confusion (=60 μm). Based on experience, if the shutter speed (sec) is less than a reciprocal value of the focal length (mm) of the photographing optical system, the image blur is roughly within a permissible range.

In a digital camera, the parameter corresponding to the shutter speed of a 35 mm film camera is the electronic-charge accumulation-time of the solid state imaging device, such as a CCD; and the camera-shake limit shutter speed is defined as a camera-shake limit electronic-charge accumulation-time. Therefore, when designing an electronic-charge accumulation-time control program for a digital camera, setting a camera-shake limit electronic-charge accumulation-time is required. Conventionally, the setting of the camera-shake limit electronic-charge accumulation-time is carried out in accordance with a conventional way in which a camera-shake limit shutter speed to counteract camera-shake in a 35 mm film camera is set.

That is, in the case of a 35 mm film, the size of the exposure area of one frame image is 36 mm×24 mm, and in a CCD of a digital camera, the size of the light-receiving surface is significantly smaller than that of the Leica-size silver halide film. When a predetermined focal length is set for the photographing optical system of the digital camera, the angle of view of the object image formed on the light receiving surface is determined by the focal length. Therefore, for setting the camera-shake limit electronic-charge accumulation-time in accordance with the conventional way for the 35 mm film camera, when the light receiving surface of the CCD is enlarged to 36 mm×24 mm, it is necessary to obtain a focal length for forming an object image with the same angle of view as that for the enlarged surface. Such a focal length is called a film-converted focal length.

Thus, the film-converted focal length is defined as follows.

$$f_c = f \times (a/b)$$

wherein $f_c$ is the film-converted focal length, f is an actual focal length of the photographing optical system of the digital camera, a is a length of a diagonal line of the exposure area (36 mm×24 mm) of one frame of 35 mm film, and b is a length of a diagonal line of the light receiving surface of the CCD.

That is, conventionally, when designing an electronic-charge accumulation-time control program, the camera-shake limit electronic-charge accumulation-time is set to a reciprocal number ($1/f_c$) of the film-converted focal length $f_c$ defined as described above.

Solid state imaging devices such as a CCD used for a digital camera have a lot of kinds of pixel pitch. Generally, the smaller the pixel pitch, the higher the resolution of the photographed image, and the greater the pixel pitch, the lower the resolution of the photographed image. The minimum circle of confusion of a silver halide film camera is a parameter determined without regard to the photographing lens or a resolution of the film, and the photographing lens or the resolution of film is higher than the diameter of the minimum circle of confusion by one figure. Therefore, it is unreasonable to apply equally the diameter of the minimum circle of confusion (=60 μm) to digital cameras having CCDs with various kinds of pixel pitch to set a camera-shake limit electronic-charge accumulation-time. Generally, since the resolution of a digital camera is lower than the resolution of film in a silver halide camera and the diameter of the minimum circle of confusion (=60 μm), a camera-shake limit electronic-charge accumulation-time set based on the minimum circle of confusion is shorter than needed. This means that a degree of freedom in design for the electronic-charge accumulation-time of a digital camera is restricted.

SUMMARY OF THE INVENTION

Therefore, an object of the present invention is to provide a digital camera provided with a solid state imaging device, in which an electronic-charge accumulation-time control program is designed based on a proper camera-shake limit electronic-charge accumulation-time.

According to the present invention, there is provided a digital camera comprising a solid state imaging device, a photographing optical system, and a storing unit.

The solid state imaging device has a light receiving surface, and is provided with an optical low-pass filter. The photographing optical system forms an object image on the light receiving surface through the optical low-pass filter. The storing unit stores an electronic-charge accumulation-time control program for determining optimum exposure parameters according to which a photography is performed through the photographing optical system and the solid state imaging device. The electronic-charge accumulation-time control program has a program diagram showing a relationship between an electronic-charge accumulation-time and an aperture value and/or an ISO speed. The program diagram has at least one bending point at which the program diagram is bent. The electronic-charge accumulation-time T at a bending point which is close to the lowest luminous value of the program diagram satisfies the formula (1), when a film-converted pixel pitch p (μm) of the solid state imaging device, which is defined by dividing a width of a photographing film by the number of pixels arranged in a horizontal direction of the light receiving surface, satisfies 4p≧60;

$$1/(f_c \times (60/4p)) \geq T \geq 1/f_c \quad (1)$$

wherein $f_c$ indicates a film-converted focal length (mm), with which, when the light receiving surface is enlarged to an area of the photographing film, the object image is formed on the enlarged area with the same angle of view as that for the photographing film.

Preferably, the photographing optical system comprises an optical-zoom type photographing optical system in which a focal length can be changed, and the electronic-charge accumulation-time control programs are provided for a plurality of focal lengths. In this case, the digital camera may further comprise a sensor, and a selecting processor. The sensor senses a focal length set by the optical-zoom type photographing optical system. The selecting processor selects an electronic-charge accumulation-time control program corresponding to the focal length sensed by the sensor. The optimum exposure parameter is determined based on the selected electronic-charge accumulation-time control program.

The digital camera may further comprise an aperture that is disposed between the photographing optical system and the solid state imaging device to adjust the amount of light of the object image, and the optimum exposure parameters contains an aperture value of the aperture and the electronic-charge accumulation-time.

The digital camera may further comprise an amplifier that amplifies a pixel signal read from the solid state imaging device, and the optimum exposure parameter contains a gain of the amplifier and the electronic-charge accumulation-time.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
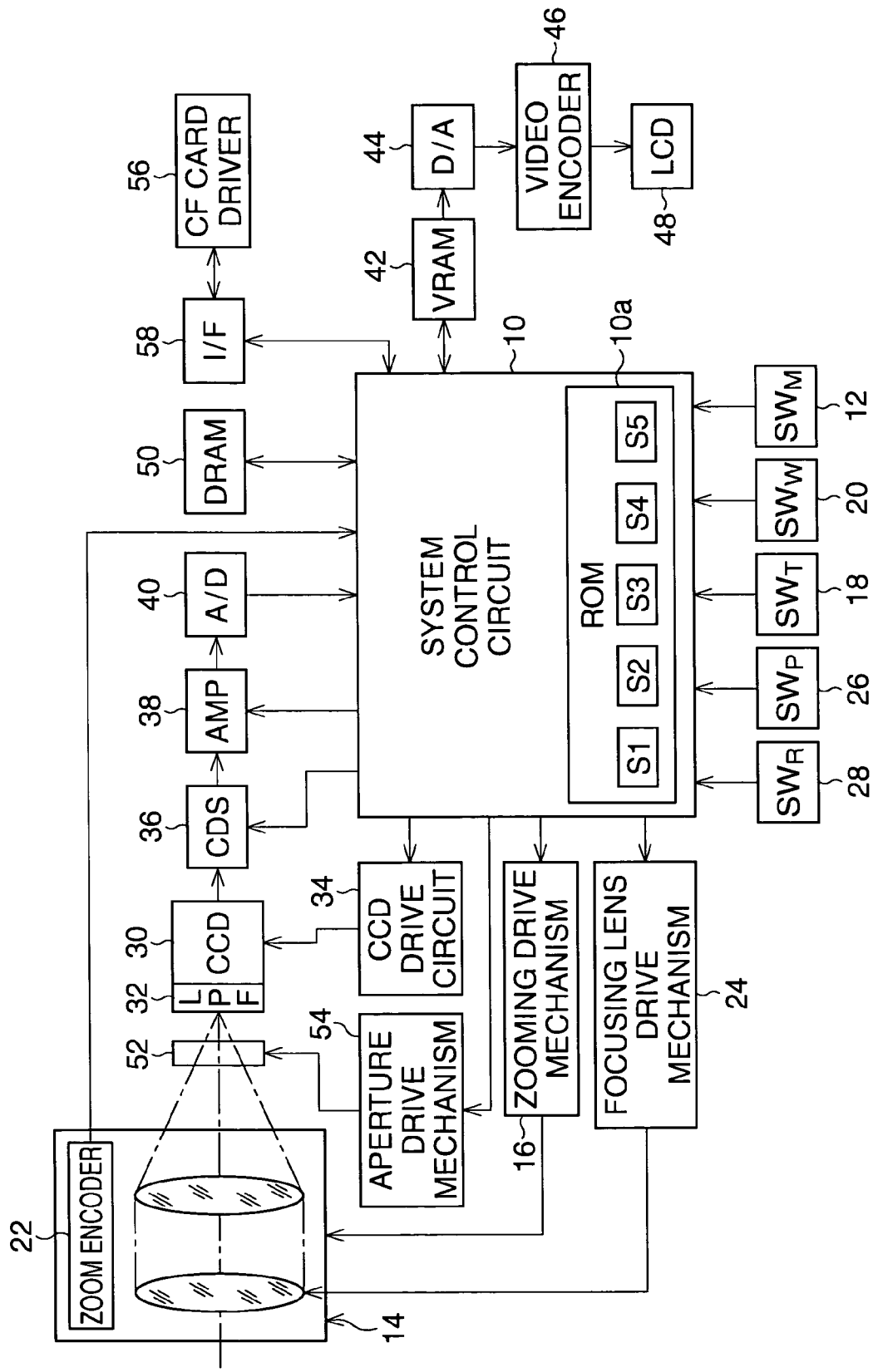
FIG. 1 is a block diagram of a digital camera to which a first embodiment of the present invention is applied.

The present invention will be described below with reference to the embodiments shown in the drawings.

FIG. 1 shows a block diagram of a digital camera to which a first embodiment of the present invention is applied. In the digital camera, a system control circuit 10 is provided to control the digital camera as a whole. The system control circuit has a micro-computer for controlling a CPU, a ROM for storing constants and a program for performing various kinds of routines, a RAM for temporarily storing data and so on, and an I/O interface.

The system control circuit 10 has a main switch ($SW_M$) 12, by which a sleep mode or a photographing mode is selected. Namely, when a battery (not shown) is mounted in the digital camera, the system control circuit 10 is operated in the sleep mode (i.e., a minimum power consumption state), so that it is monitored at a predetermined time interval only whether the main switch 12 is turned ON. When the main switch 12 is turned ON, the mode is changed from the sleep mode to the photographing mode, a photographing process routine is executed by the system control circuit 10 as described later.

An optical-zoom type photographing optical system 14 is assembled in the digital camera. The photographing optical system 14 is driven by a zooming drive mechanism 16, in which a driving motor such as a stepping motor, rotating under the control of the system control circuit 10, is housed. A focal length of the photographing optical system 14 is set by a rotation of the driving motor.

For controlling the rotation of the driving motor of the zooming drive mechanism 16, the system control circuit 10 is provided with a telephoto switch ($SW_T$) 18 and a wide-angle switch ($SW_W$) 20. When the telephoto switch 18 is turned ON, the driving motor of the zooming drive mechanism 16 is rotated in the forward direction, so that the focal length of the photographing optical system 14 is moved to the telephoto end. Conversely, when the wide-angel switch 20 is turned ON, the driving motor of the zooming drive mechanism 16 is rotated in the reverse direction, so that the focal length of the photographing optical system 14 is moved to the wide-angle end.

A zoom encoder 22 is assembled in the photographing optical system 14, and encoder data is output from the zoom encoder 22 to the system control circuit 10. The system control circuit 10 receives the encoder data, to recognize the present focal length as a focal length closest to one of five focal lengths $f_1$, $f_2$, $f_3$, $f_4$, and $f_5$, which are set before hand.

In the embodiment, the photographing optical system 14 is a type of an automatic focusing system. Namely, a focusing lens contained in the photographing optical system 14 is driven by a focusing lens drive mechanism 24, so that a focusing operation for an object image is automatically carried out. Thus, in a similar way as the zooming drive mechanism 16, a driving motor, such as a stepping motor, rotated under the control of the system control circuit 10 is housed in the focusing lens drive mechanism 24, so that the focusing lens of the photographing optical system 14 is driven to automatically focus the object image, by rotating the driving motor as described later.

The system control circuit 10 is further provided with a photometry switch ($SW_P$) 26 and a release switch ($SW_R$) 28. The switches 26 and 28 are operated through a common release button (not shown). Namely, when partly depressing the release button, the photometry switch 26 is turned ON, and when fully depressing the release button, the release switch 28 is turned ON. Note that, as described later, when the photometry switch 26 is turned ON, a photometry measurement is performed, and when the release switch 28 is turned ON, a photographing operation is performed.

A solid state imaging device 30 such as a CCD is disposed behind the photographing optical system 14, and an optical low-pass filter 32 is provided on a light receiving surface of the CCD 30. The digital camera is constructed in such a manner that a full color photography can be performed. For this, a color filter (not shown) is disposed between the light receiving surface of the CCD 30 and the optical low-pass filter 32. An object image captured by the photographing optical system 14 is formed on the light receiving surface of the CCD 30 through the optical low-pass filter 32, so that the object image is photo-electric converted to one frame's worth of color pixel signals.

Color pixel signals are sequentially read out from the CCD 30, and the reading operation is carried out in accordance with a read-out clock pulse output from a CCD drive circuit 34 to the CCD 30. Other than an operation in which the release switch 28 is turned ON, the color pixel signal read from the CCD 30 is thinned out. Namely, a number of pixels less than the actual number of pixels of the CCD 30 is read out from the CCD 30 as one frame's worth of color pixel signals. Conversely, right after the release switch 28 is turned ON, only once, one frame's worth of color pixel signals is read out without thinning out.

The reading operation is performed in accordance with a switch of the read-out clock pulse output from the CCD drive circuit 34. Namely, the CCD drive circuit 34 is operated under control of the system control circuit 10, and usually, a thinning-out read-out clock pulse, by which a color pixel signal is thinned out, is output from the CCD 30, and right after the release switch 28 is turned ON, a photographing read-out clock pulse is output. When one frame's worth of color pixel signals is read out in accordance with the photographing read-out clock pulse from the CCD 30 without thinning out, the thinning-out read-out clock pulse is again output from the CCD drive circuit 34.

The color pixel signal sequentially read out from the CCD 30 is input to an amplifier (AMP) 38 through a correlated double sampling circuit (CDS) 36, so that the color pixel signal is amplified with a proper gain. The color pixel signal is then input to an A/D converter 40, to be converted to a digital color pixel signal, which is then input to the system control circuit 10.

The digital camera is constructed in such a manner that an image captured through the photographing optical system 14 is monitored as a moving picture while the main switch is turned ON. Namely, the digital camera is provided with a video RAM (VRAM) 42, a D/A converter 44, a video encoder 46, and a liquid crystal display (LCD) panel 48. Further, for monitoring an image captured through the photographing optical system 14 as a moving picture, a reading operation of one frame's worth of thinned-out pixel signals from the CCD 30 is repeated at every predetermined time. For example, when the NTSC system is adopted, the reading operation of one frame's worth of thinned-out pixel signals is carried out 30 times a second.

The thinned-out color pixel signal input from the A/D converter 40 through the system control circuit 10 is subjected to an imaging process, such as a white balance process and a gamma correction, and converted to a luminance signal and two color difference signals, which are written in a DRAM 50. When the amount of luminance signal and two color difference signals written in the DRAM 50 reach one frame's worth, the one frame's worth of luminance signals and color difference signals are read out from the DRAM 50, and written in the VRAM 42. The luminance signal and color difference signals are sequentially read out from the VRAM 42, and input to the D/A converter 44, where the luminance signal and two color difference signals are converted to analogue signals. The luminance signal and two color difference signals are then input to a video encoder 46, where the object image captured through the photographing optical system 14 is indicated as a moving picture by the LCD panel 48 in accordance with the video signal.

When an object image is indicated as a moving picture by the LCD panel 48, an electronic-charge accumulation-time of the CCD 30 for obtaining one frame's worth of color pixel signals is set to a predetermined constant time, and a gain of the amplifier 38 is adjusted to maintain the brightness of the moving image on the LCD panel 48. Namely, an average luminance value of one frame worth's of luminance signals obtained from one frame's worth of thinned-out color pixel signals is compared with a reference value, and the gain of the amplifier 38 is adjusted so that the difference between the average luminance value and the reference value becomes zero. Due to this, regardless of the brightness of the object image, the brightness of the moving picture indicated on the LCD panel 48 is maintained constant.

One frame's worth of the luminance signals obtained from one frame's worth of thinned-out color pixel signals is also utilized for operating the focusing lens drive mechanism 24. Namely, in the embodiment, the contrast method is used to perform an automatic focusing operation of the photographing optical system 14. As is well known, in the automatic focusing operation according to the contrast method, a luminance difference between pixels, adjacent to each other, of an area contained in an object image is calculated, and the focusing lens of the photographing optical system 14 is moved by the focusing lens drive mechanism 24 so that the contrast of the area becomes the maximum. Thus, a moving picture indicated on the LCD panel 48 is always clear or focused.

For obtaining an optimum exposure when taking a still image, an aperture 52 is utilized, and disposed between the photographing optical system 14 and the optical low-pass filter 32. The aperture 52 is driven by an aperture drive mechanism 54, in which, similarly to the zooming drive mechanism 16 and the focusing lens drive mechanism 24, a driving motor, such as a stepping motor, rotated under the control of the system control circuit 10, is housed. The aperture 52 is usually fully open. Conversely, when photographing a still image, the aperture 52 is automatically stopped down to a predetermined aperture value Av by the driving motor of the aperture drive mechanism 54, while an electronic-charge accumulation-time Tv corresponding to the aperture value Av is set for the CCD 30, so that an optimum exposure value Ev for the photography of the still image is ensured. Note that "Av", "Tv", and "Ev" are used for indicating the optimum exposure of a photography using a silver halide film, according to the APEX system (Additive System of Photographic Exposure). That is, Ev=Av+Tv. Although "Tv" essentially represents the shutter speed, it is defined as an electronic-charge accumulation-time of the CCD 30 in this specification.

In detail, five automatic exposure (AE) tables S1, S2, S3, S4, and S5, corresponding to the five focal lengths $f_1$, $f_2$, $f_3$, $f_4$, and $f_5$ of the photographing optical system 14, are stored in a ROM 10a of the system control circuit 10. In each of the AE tables, aperture values Av and electronic-charge accumulation-times Tv for obtaining the optimum exposure value Ev are written as a two-dimensional map as described later. The average luminance value for one frame's worth of luminance signals is used not only for maintaining constant brightness of the moving picture on the LCD panel 48, but also as a photometry value of the object image when the photometry switch 26 is turned ON. Based on the photometry value, the optimum exposure value Ev is obtained when photographing a still image, and based on the optimum exposure value Ev, an aperture value Av and an electronic-charge accumulation-time Tv are calculated according to the AE table.

When the release switch 28 is turned ON while a photometry measurement is performed by turning ON the photometry switch 26, a photography of the object image is carried out by the CCD 30 with the optimum exposure value Ev. As described above, when the release switch 28 is turned ON, an output of the read-out clock pulse from the CCD device circuit 34 is changed from the thinning-out read-out clock pulse to the photographing read-out clock pulse, so that one frame's worth of color pixel signals output from the CCD 30 are read out without thinning out. In a similar way as a reading operation with thinning out, one frame's worth of the color pixel signals without thinning out is input to the AMP 38 through the CDS 36, so that the color pixel signals are amplified with a proper gain, and are then A/D-converted by the A/D converter 40 and input to the system control circuit 10.

The color pixel signals without thinning out are subjected to image processing, such as a white balance process and a gamma correction, and stored in a recording medium as still image data. In the embodiment, the CF card memory (i.e. flash memory) is used for storing the still image data, and is detachably attached to a CF card driver 56. The CF card driver 56 is connected to the system control circuit 10 through an interface (I/F) circuit 58. Thus, the still image data is stored in the CF card memory mounted in the CF card driver 56 through the I/F 58.

Note that it is possible to indicate a photographed image based on still image data stored in the CF card memory, on the LCD panel 48. Namely, one frame's worth of still image data is read out from the CF memory card, thinned out, and then stored in the VRAM 42, so that the photographed image is monitored on the LCD panel 48.

A design of each of the AE tables S1 through S5 stored in the ROM 10*a* of the system control circuit 10 is described below.

As described above, in a conventional 35 mm film camera, when designing a shutter speed program for determining an optimum exposure, it is required to set a camera-shake limit shutter speed. The camera-shake limit shutter speed is to the same extent in which the allowance amount of image blur occurring because of out-of-focus, i.e., the diameter of the minimum circle of confusion is 60 μm, and it is considered based on an experiment that the image blur is within an allowable range if the shutter speed is less than the reciprocal value of the focal length (mm) of the photographing optical system in units of seconds. In a digital camera, conventionally, the camera-shake limit electric charge accumulation time is determined in a similar way as the camera-shake limit shutter speed of 35 mm film camera. In the digital camera, however, the camera-shake limit electric charge accumulation time corresponding to the camera-shake limit shutter speed is usually set to a value shorter than necessary, based on the minimum circle of confusion, since a resolution of the digital camera is inferior to the resolution of the silver halide film camera, and thus, the degree of freedom in design for the electronic-charge accumulation-time is restricted. In the embodiment, as described below, the camera-shake limit electric charge accumulation time is rationally obtained.

In the digital camera, the resolution of the photographed image is determined in accordance with the pixel pitch of the CCD 30. Namely, the smaller the pixel pitch, the higher the resolution of the photographed image. The size of the light receiving surface of a CCD 30 is varies, but is much smaller than that of one frame of 35 mm film (i.e., 36 mm×24 mm). Therefore, in the embodiment, a 35 mm-film-converted pixel pitch p is defined for the pixel pitch of the CCD 30, as follows.

$$p=36000 \text{ μm}/N$$

wherein N is the number of pixels arranged laterally (in a horizontal direction) of the light receiving surface of the CCD 30. Namely, the 35 mm-film-converted pixel pitch p is defined by dividing the width (36 mm) of the one frame of 35 mm film by the number of pixels arranged in a horizontal direction of the CCD 30.

The CCD 30 cannot resolve components of an object image having a higher spatial frequency than the pixel arrangement spatial frequency (i.e. pixel pitch) of the CCD 30, but, in realtily, the spatial frequency of the object image, which can be resolved, is lower than half of the pixel arrangement spatial frequency (i.e., Nyquist spatial frequency) because of existence of the optical low-pass filter 32. Thus, the optical low-pass filter 32 removes a spatial frequency component higher than the Nyquist spatial frequency from the object image, so that the higher spatial frequency component does not reach the light receiving surface of the CCD 30. This prevents aliasing distortion from occurring. Further, an amplitude of a component of the object image having a spatial frequency, which is higher than a half the Nyquist spatial frequency, is largely reduced because of the optical low-pass filter 32. As a result, in the CCD 30, the spatial frequency of the object image, which can be resolved, becomes lower than a quarter of the pixel arrangement spatial frequency, because of the existence of the optical low-pass filter 32.

Figure 2:
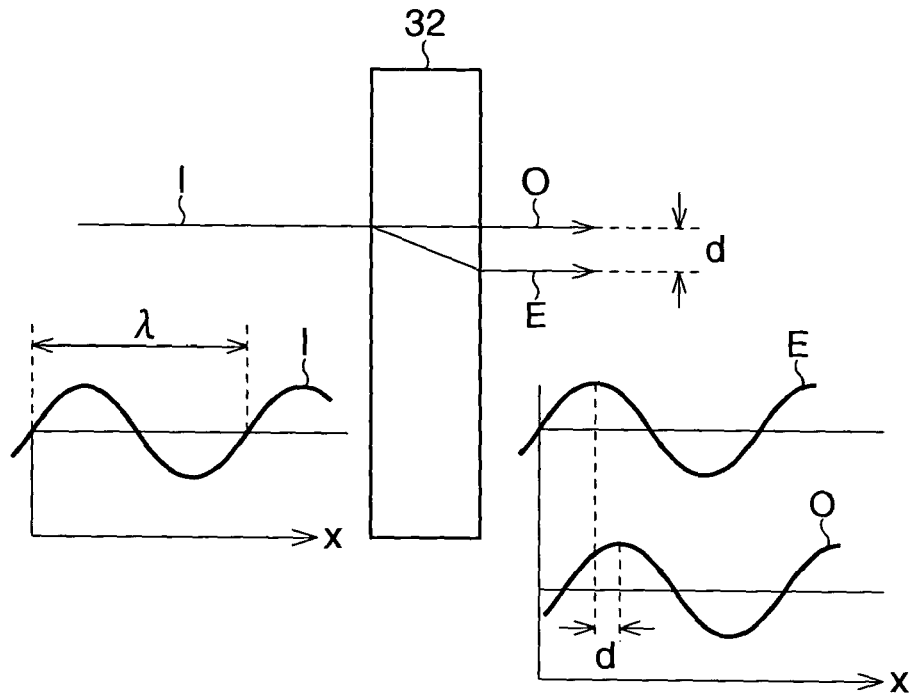
FIG. 2 is a view schematically showing a function of an optical low-pass filter provided in a CCD of the digital camera.

FIG. 2 schematically shows a function of the optical low-pass filter 32. The optical low-pass filter 32 is made of a double refractive plate, such as a quartz plate, for example, and has a function in which incident light beam I is divided into normal light beam O and abnormal light beam E, with a division width d. Therefore, the output light beam of the optical low-pass filter 32 is a composite of the normal light beam O and the abnormal light beam E. Supposing that the incident light beam I has the wave length λ, and the optical low-pass filter 32 is placed at a position x, the incident light beam I is indicated as follows.

$$V_i(\lambda)=\sin(2\pi(x/\lambda))$$

The output light beam is indicated by the following formula, supposing that the output light beam is a composite of the normal light beam O and the abnormal light beam E.

$$v_o(\lambda) = 1/2\sin(2\pi(x/\lambda)) + 1/2\sin(2\pi(x/\lambda - d/\lambda))$$
$$= \sin(2\pi(x/\lambda - d/\lambda)) \times \cos(2\pi(d/\lambda))$$

wherein item ½ sin(2π(x/λ)) is a component of the normal light beam O , and item ½ sin(2π(x/λ-d/λ)) is a component of the abnormal light beam E.

The division width d can be arbitrarily determined by selecting a cutting angle of the quartz plate. If the pixel pitch of the CCD 30 is set to a value equal to the division width d, an amplitude of the component of the object image having a spatial frequency equal to the Nyquist spatial frequency, is reduced to zero. However, it is impossible to drastically reduce only the amplitude of the component of the object image having a spatial frequency equal to the Nyquist spatial frequency, and in reality, an amplitude of components of the object image having a spatial frequency higher than a half the Nyquist spatial frequency, are reduced because of the optical low-pass filter 32.

Figure 3:
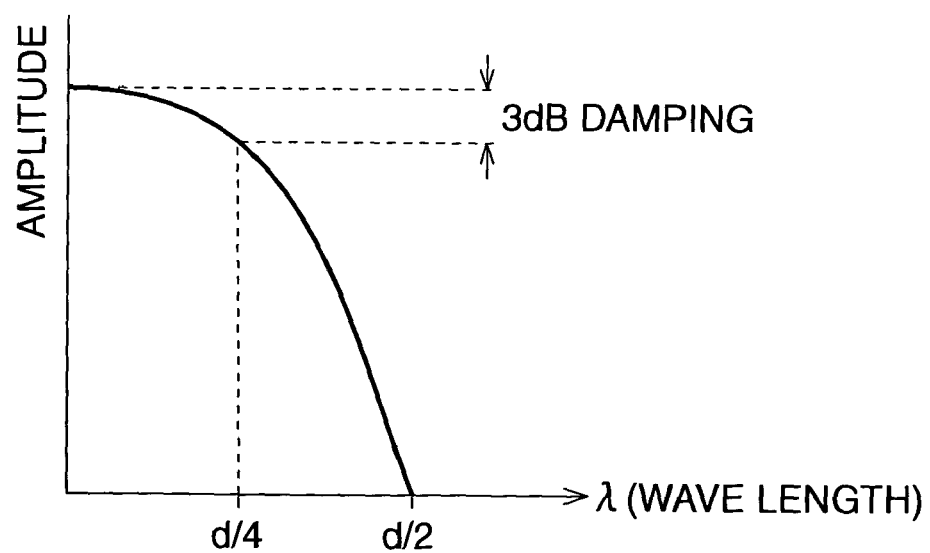
FIG. 3 is a graph showing the damping characteristics of the amplitude of an output light beam passing through an optical low-pass filter.

FIG. 3 is a graph showing damping characteristics of the amplitude of an output light beam passing through the optical low-pass filter 32. As understood from the graph, although an amplitude of a component of the object image having a spatial frequency (corresponding to $\lambda=d/2$) equal to the Nyquist spatial frequency becomes zero, an amplitude of a component of the object image having a spatial frequency higher than a half the Nyquist spatial frequency (corresponding to $\lambda=d/4$) is reduced because of the optical low-pass filter 32. The reduced amount of amplitude of the component of the object image having a spatial frequency equal to a half the Nyquist spatial frequency (corresponding to $\lambda=d/4$) is approximately 3dB. In other words, the spatial frequency of the boundary at which the contrast of the object image having a spatial frequency lower than a half the Nyquist spatial frequency (corresponding to $\lambda=d/4$) is reduced to less than the effective value ($1/\sqrt{2}$), is a spatial frequency lower than a half the Nyquist spatial frequency (corresponding to $\lambda=d/4$).

Therefore, as described above, in the CCD 30, the spatial frequency of the object image, which can be resolved, is lower than ¼ d of the pixel arrangement spatial frequency of the CCD 30, because of the existence of the optical low-pass filter 32. This means that, for a digital camera, the diameter of a converted minimum circle of confusion 4p (d=p) can be used as a parameter corresponding to the diameter of the minimum circle of confusion (=60 μm) used as a parameter for setting a camera-shake limit shutter speed of a conventional 35 mm film camera. Note that, when the converted pixel pitch p is too small so that the diameter of the converted minimum circle of confusion 4p is less than the diameter of the minimum circle of confusion (=60 μm), 60 μm is used as the diameter of the circle of confusion, since the resolution is higher than the diameter of the minimum circle of confusion (=60 μm).

In a first example for a digital camera of the 3 million pixel class (2048×1536), in which the film-converted focal length is 111 mm, the camera-shake limit electronic-charge accumulation-time is set to 1/111 (sec) according to the conventional way. Conversely, according to the embodiment, the camera-shake limit electronic-charge accumulation-time Q is calculated as follows. Namely, the film-converted pixel pitch p is approximately 17.58 μm (36000/2048), and the diameter of the converted minimum circle of confusion 4p is approximately 70.32 μm. Therefore, the camera-shake limit electronic-charge accumulation-time Q is obtained as approximately 1/95 (sec) according to the following proportional allotment.

$Q:70.32=1/111:60$

In a second example, for a digital camera of the 2 million pixel class (1600×1200), in which the film-converted focal length is 105 mm, the camera-shake limit electronic-charge accumulation-time is set to 1/105 (sec) according to the conventional way. Conversely, according to the embodiment, the camera-shake limit electronic-charge accumulation-time Q is calculated as follows. Namely, the film-converted pixel pitch p is approximately 22.50 μm (36000/1600), and the diameter of the converted minimum circle of confusion 4p is approximately 90.00 μm. Therefore, the camera-shake limit electronic-charge accumulation-time Q is obtained as approximately 1/70 (sec) according to the following proportional allotment.

$Q:90.00=1/105:60$

In a third example, for a digital camera of the 1.3 million pixel class (1280×960), in which the film-converted focal length is 114 mm, the camera-shake limit electronic-charge accumulation-time is set to 1/114 (sec) according to the conventional way. Conversely, according to the embodiment, the camera-shake limit electronic-charge accumulation-time Q is calculated as follows. Namely, the film-converted pixel pitch p is approximately 28.12 μm (36000/1280), and the diameter of the converted minimum circle of confusion 4p is approximately 72.48 μm. Therefore, the camera-shake limit electronic-charge accumulation-time Q is obtained as approximately 1/61 (sec) according to the following proportional allotment.

$Q:72.48=1/114:60$

In a fourth example for a digital camera of the 0.85 million pixel class (1024×768), in which the film-converted focal length is 280 mm, the camera-shake limit electronic-charge accumulation-time is set to 1/280 (sec) according to the conventional way. Conversely, according to the embodiment, the camera-shake limit electronic-charge accumulation-time Q is calculated as follows. Namely, the film-converted pixel pitch p is approximately 35.16 μm (36000/1024), and the diameter of the converted minimum circle of confusion 4p is approximately 140.64 μm. Therefore, the camera-shake limit electronic-charge accumulation-time Q is obtained as approximately 1/120 (sec) according to the following proportional allotment.

$Q:140.64=1/280:60$

In a fifth example for a digital camera of the 5 million pixel class (2560×1920), in which the film-converted focal length is 111 mm, the camera-shake limit electronic-charge accumulation-time is set to 1/111 (sec) according to the conventional way. Conversely, according to the embodiment, the camera-shake limit electronic-charge accumulation-time Q is calculated as follows. Namely, the film-converted pixel pitch p is approximately 14.06 μm (36000/2560), and the diameter of the converted minimum circle of confusion 4p is approximately 56.24 μm. In this example, since the diameter of the converted minimum circle of confusion 4p is less than 60 μm, the camera-shake limit electronic-charge accumulation-time Q is set to 1/111 (sec) according to the conventional way.

Figure 4:
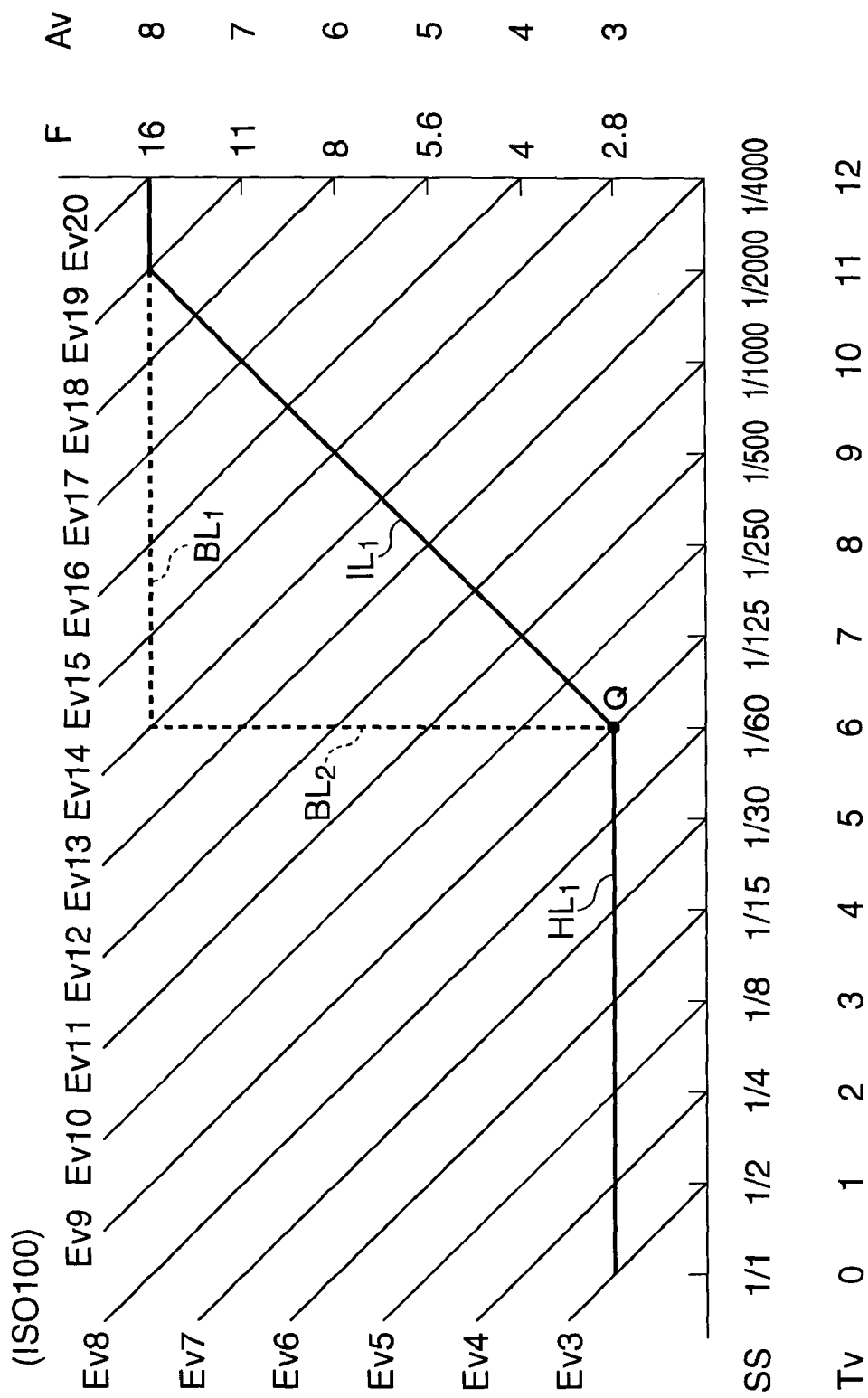
FIG. 4 is a view showing an example of a program diagram formed of an aperture value and an electronic-charge accumulation-time, indicted on a chart of the APEX system.

FIG. 4 shows an example of a program diagram showing a relationship between an aperture value Av and an electronic-charge accumulation-time Tv, indicted on a chart of the APEX system. This chart shows a case in which the sensitivity of the CCD 30 corresponds to the film sensitivity ISO=100. An f-number F indicates the brightness of the photographing optical system 14, and corresponds to aperture value Av. The aperture value Av is given a value from APEX value Av=3 to APEX value Av=8. The electronic-charge accumulation-time Tv is given a value from APEX value Tv=0 to APEX value Tv=12, and an electronic-charge accumulation-time SS(sec) corresponding to each of the APEX values is indicated. An optimum exposure value Ev is given a value from the APEX value Ev=3 to APEX value Ev=20.

In the example of the program diagram shown in FIG. 4, the camera-shake limit electronic-charge accumulation-time Q is set to 1/60 (sec), which is obtained according to the method described above. The camera-shake limit electronic-charge accumulation-time Q can be set to a point contained in the one of line segments of the optimum exposure values Ev=9 to Ev=14, and in the example of FIG. 4, the camera-shake limit electronic-charge accumulation-time Q is set to a point contained in the line segment of the optimum exposure values Ev=9. Thus, on the program diagram, the camera-shake limit electronic-charge accumulation-time Q is set to a point of intersection of a horizontal line segment $HL_1$, extending to a low-luminance side below the optimum exposure value Ev=9, and a slant line segment $IL_1$, extending to a high-luminance side above the optimum exposure value Ev=9. Namely, the camera-shake limit electronic-charge accumulation-time Q is the bending point at which the program diagram is bent and is positioned at the lower luminance. The horizontal line segment $HL_1$ is definitely determined by determining the set point of the camera-shake limit electronic-charge accumulation-time Q, and the slant line segment $IL_1$ can be arbitrarily drawn from the point of the camera-shake limit electronic-charge accumulation-time Q toward the higher luminance.

When the photometry value obtained by turning ON the photometry switch 26 is less than or equal to the optimum exposure value Ev=8, the optimum exposure condition is obtained by changing only the electronic-charge accumulation-time Tv. Accordingly, a warning, which indicates that an image blur may happen because of a camera-shake, can be displayed on the LCD panel 48. Conversely, when the photometry value is greater than or equal to the optimum exposure value Ev=9, the aperture value Av and the electronic-charge accumulation-time Tv are determined according to the slant line segment $IL_1$. For example, if the photometry value is the optimum exposure value Ev=13, the aperture value Av is Ev=5, and the electronic-charge accumulation-time Tv is Ev=8 (i.e., ½₅₀ (sec)).

Thus, the electronic-charge accumulation-time Tv at a bending point which is close to the lowest luminous value of the program diagram satisfies the formula (2), when a film-converted pixel pitch p (μm) of the CCD 30, which is defined by dividing a width of a photographing film by the number of pixels arranged in a horizontal direction of the light receiving surface, satisfies 4p≧60;

$$1/(f_c \times (60/4p)) \geq Tv \geq 1/f_c \qquad (2)$$

wherein $f_c$, indicates a film-converted focal length (mm), with which, when the light receiving surface is enlarged to an area of the photographing film, the object image is formed on the enlarged area with the same angle of view as that for the photographing film.

As described above, if the camera-shake limit electronic-charge accumulation-time Q is obtained according to a conventional way, it is shorter than ⅟₆₀ (sec) Therefore, the set point of the camera-shake limit electronic-charge accumulation-time Q is shifted from the point shown in FIG. 4 to the right side, i.e., the side of a higher luminance, so that a degree of freedom in setting the slant line segment $IL_1$ contained in the program diagram is restricted.

As shown in FIG. 4, the slant line segment $IL_1$ of the program diagram can be substituted with a horizontal line segment BL, and a vertical line segment $BL_2$, which are indicted by broken lines. In this case, when the optimum exposure value Ev is in the range indicated by the horizontal line segment $BL_1$, the aperture value Av is always set to the maximum aperture value Av=8, so that the optimum exposure condition can be obtained by controlling only the electronic-charge accumulation-time Tv. Thus, since the aperture 52 is stopped down to the maximum aperture value Av=8 so that only an area of the photographing optical system 14, in which the lens performance is excellent, or an area around the optical axis, is utilized, a picture having a high resolution can be taken. On the other hand, when the optimum exposure value Ev is in the range indicated by the vertical line segment $BL_2$, only the aperture value is changed while the electronic-charge accumulation-time is maintained at the camera-shake limit electronic-charge accumulation-time Tv=6 (i.e., ⅟₆₀ (sec)), and therefore, a camera-shake photography is prevented. Note that, from the point of view of preventing camera-shake photography, the bending point can be set at a higher shutter speed in comparison with Tv=6.

In the first embodiment, a program diagram as indicated in FIG. 4, is prepared for each of the five focal lengths $f_1$, $f_2$, $f_3$, $f_4$, and $f_5$. Each of the program diagrams is formed as a two-dimensional map which is an AE table (S1, S2, S3, S4, and S5), and stored in the ROM 10a of the system control circuit 10. Therefore, when the release switch 28 is turned ON and any focal length is set, one of the focal lengths ($f_1$, $f_2$, $f_3$, $f_4$, $f_5$), which is the closest to the set focal length, is selected as the focal length data, and the CCD 30 is exposed with the optimum exposure conditions.

Figure 5:
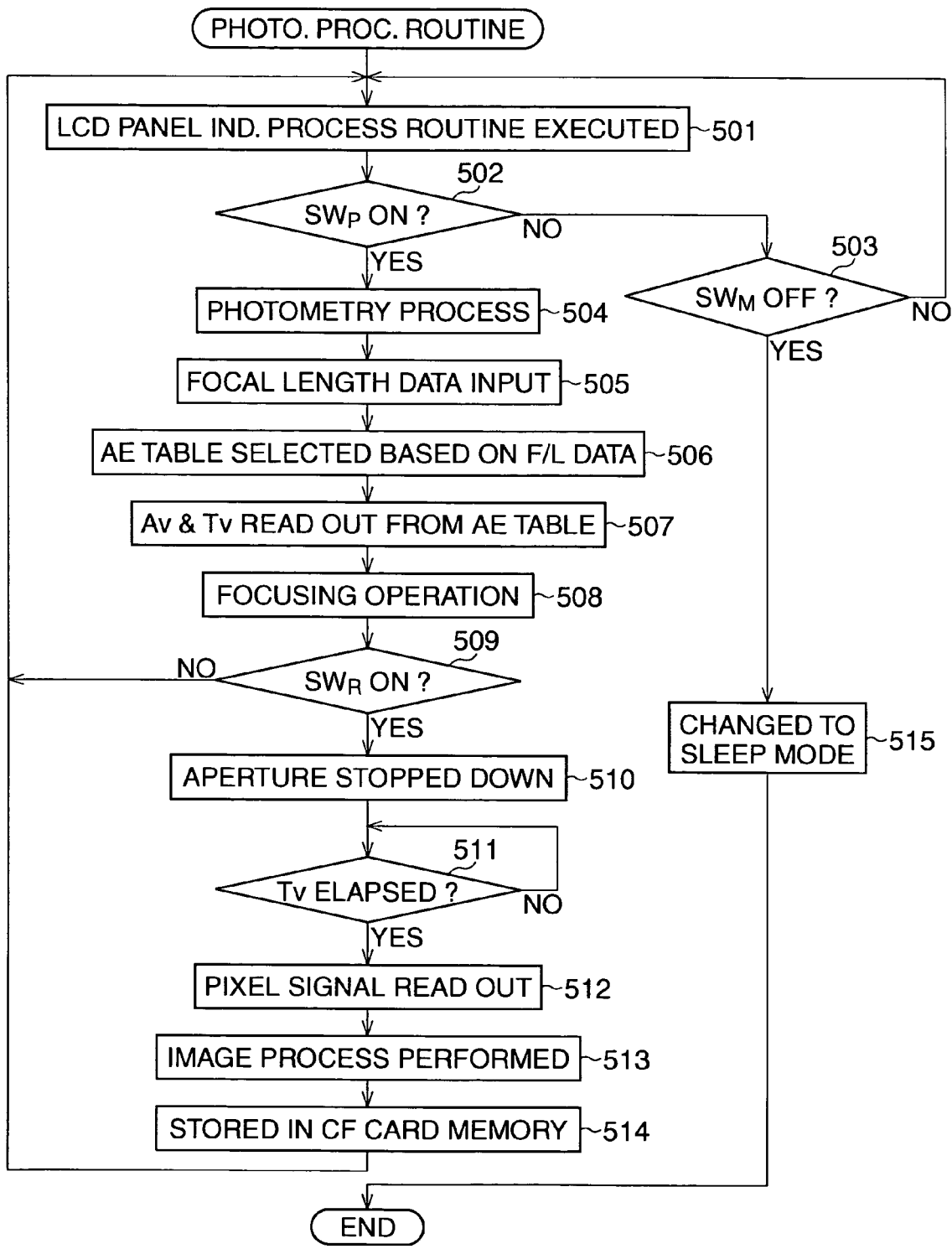
FIG. 5 is a flowchart of a photographing process routine executed by a system control circuit.

FIG. 5 shows a flowchart of a photographing process routine executed by the system control circuit 10. In the sleep mode (i.e., the minimum power consumption state), when it is confirmed that the main switch 12 is turned ON, the mode is changed from the sleep mode to the photographing mode, and the photographing process routine is executed.

In Step 501, an LCD panel indication process routine is executed, which is well known, and by which an object image is indicated by the LCD panel 48 as a moving picture. Namely, one frame's worth of thinned-out color pixel signals is read out from the CCD 30 at a predetermined time interval, so that a moving object image is indicated on the LCD panel.

During the execution of the LCD panel indication process routine, when the telephoto switch 18 or the wide-angle switch 20 is operated, so that the zooming drive mechanism 16 is driven, and the focal length of the photographing optical system 14 is set, one of the focal lengths $f_1$, $f_2$, $f_3$, $f_4$, and $f_5$ is selected as the focal length data. Further, during the execution of the LCD panel indication process routine, every time one frame's worth of thinned-out color pixel signal is read out from the CCD 30 at a predetermined time interval, the focusing lens drive mechanism 24 is driven according to the contrast method, so that a moving object image indicated on the LCD panel 48 is always in focus.

In Step 502, it is determined whether the photometry switch 26 is turned ON. If the photometry switch 26 is turned OFF, the process goes to Step 503, in which it is determined whether the main switch 12 is turned OFF. When the main switch 12 is turned ON, the process goes back to Step 501. Thus, when the main switch 12 is turned ON, an object image captured through the photographing optical system 14 is indicated on the LCD panel 48 as a moving picture, and a turning-ON of the photometry switch 26 is checked in Step 502.

When it is confirmed that the photometry switch 26 is turned ON, Step 504 is executed, in which a photometry process is carried out. In the photometry process, an optimum exposure value Ev is obtained based on an average luminance value (i.e., a photometry value) of one frame's worth of luminance signals which is obtained from one frame's worth of thinned-out color pixel signals read out from the CCD 30. Then, in Step 505, encoder data is input from the zoom encoder 22, so that the present focal length is recognized as one of the focal length data ($f_1$, $f_2$, $f_3$, $f_4$, $f_5$).

In Step 506, one of the AE tables S1 through S5 corresponding to the focal length data ($f_1$, $f_2$, $f_3$, $f_4$, $f_5$), recognized in Step 505, is selected. In Step 507, an aperture value Av and an electronic-charge accumulation-time Tv are read from the selected AE table, based on the optimum exposure value Ev. Then, in Step 508, a focusing operation is carried out. Namely, the focusing lens drive mechanism 24 is driven according to the contrast method, so that an object image formed on the light receiving surface of the CCD 30 is focused.

In Step 509, it is determined whether the release switch 28 is turned ON. When the release switch 28 is turned OFF, the process goes back to Step 501. Conversely, when the photometry switch 26 is ON, the process including Steps 504 through 508 is performed again.

When it is confirmed in Step 509 that the release switch 26 is ON, Step 510 is executed, in which the aperture 52 is stopped down based on the aperture value Av by driving the aperture drive mechanism 54, and residual electric charge is discharged from the CCD 30. Then, in Step 511, an elapse of the electronic-charge accumulation-time Tv is checked.

When it is confirmed in Step 511 that the electronic-charge accumulation-time Tv has passed, Step 512 is performed, in which one frame's worth of color pixel signals is read out from the CCD 30 without being thinned out. The one frame's worth of color pixel signals is input to the system control circuit 10 as one frame's worth of digital color pixel signals through the CDS 36, the amplifier 36, and the A/D converter 40. Then, in Step 513, the one frame's worth of digital color pixel signals is subjected to image processes, such as a white balance process and a gamma process, and in Step 514, the one frame's worth of digital color pixel signals is stored in a CF card memory attached to the CF card driver 56.

Then, the process goes back to Step 501, so that the photographing process routine is kept executing as long as the main switch 12 is turned ON. Conversely, when it is confirmed in Step 503 that the main switch 12 is turned OFF, the process goes to Step 515, in which the mode is changed from the photographing mode to the sleep mode, and the photographing process routine ends.

Figure 6:
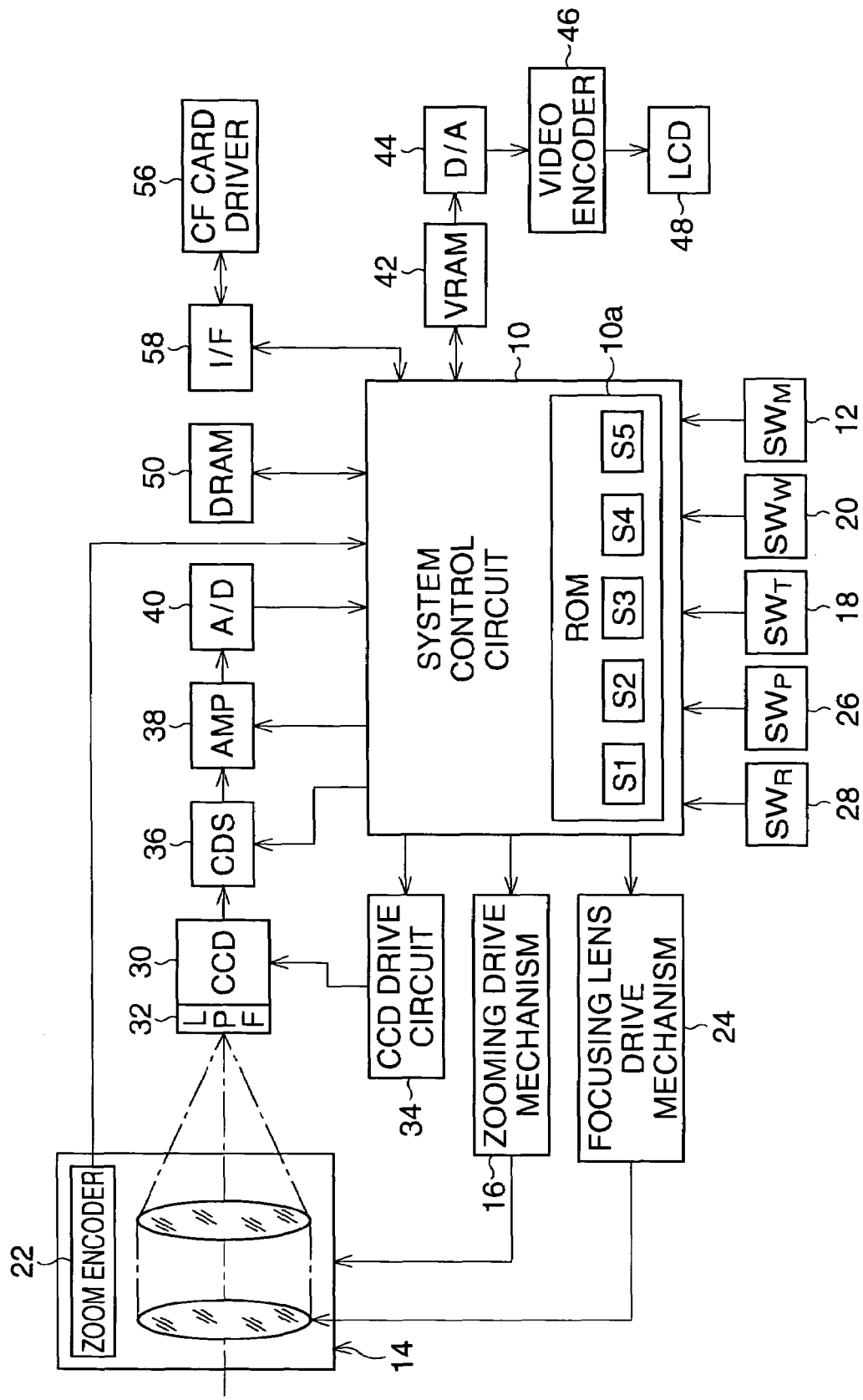
FIG. 6 is a block diagram of a digital camera to which a second embodiment of the present invention is applied.

FIG. 6 shows a block diagram of a digital camera to which a second embodiment of the present invention is applied. This embodiment is substantially the same as the first embodiment shown in FIG. 1, except that the aperture 52 and the aperture drive mechanism 54 are not provided. Namely, the photographing optical system 14 is always open, and the f-number is f4 (i.e., Av=4), for example. The gain of the amplifier 38 is variable. The amplifier 38 is a voltage-controlled amplifier, for example, and the gain is controlled in accordance with a variable voltage output from the system control circuit 10.

In the ROM 10a of the system control circuit 10, the AE tables S1 through S5 corresponding to five focal lengths $f_1$, $f_2$, $f_3$, $f_4$, and $f_5$ of the photographing optical system 14 are stored, and program diagrams, showing a relationship between a gain of the amplifier 38 and an electronic-charge accumulation-time Tv, are written as a two-dimensional map.

Figure 7:
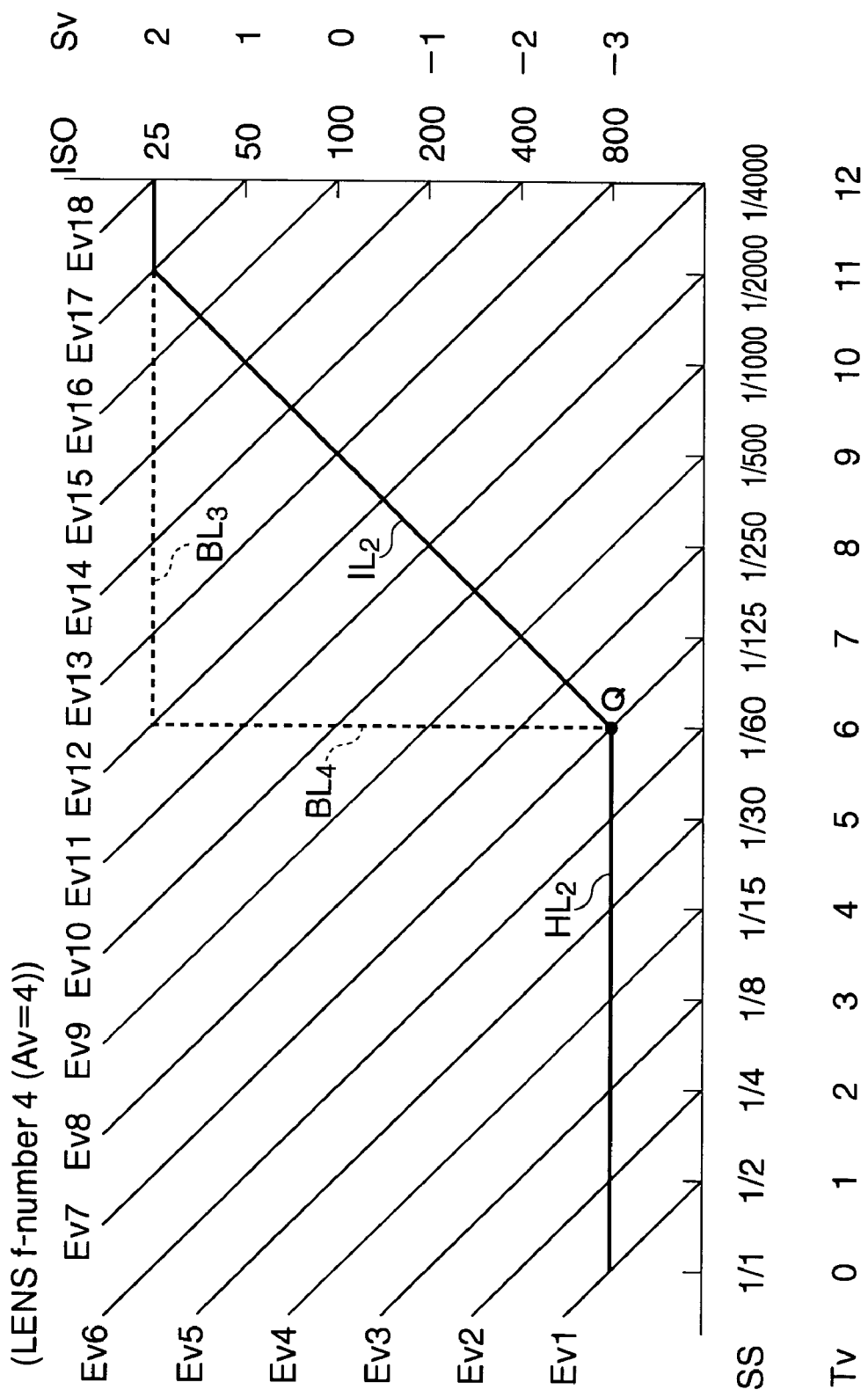
FIG. 7 is a view showing an example of a program diagram formed of an ISO speed and an electronic-charge accumulation-time, indicted on a chart of the APEX system.

FIG. 7 shows an example of a program diagram showing a relationship between an ISO speed and an electronic-charge accumulation-time Tv, indicted on a chart of the APEX system. An ISO speed of a silver halide film camera corresponds to a gain of the amplifier 38 of a digital camera. Therefore, the program diagram shown in FIG. 7 is peculiar to a digital camera. As understood from FIG. 7, ISO=25 through ISO=800 correspond to Sv=2 through Sv=−3, which are APEX values of the ISO speed. Note that the gain of the amplifier 38 corresponding to ISO=25 is the minimum amplification factor, and the gain of the amplifier 38 corresponding to ISO=800 is the maximum amplification factor.

In the example of the program diagram shown in FIG. 7, similarly to the example of FIG. 4, the camera-shake limit electronic-charge accumulation-time Q is set to 1/60 (sec), which is obtained according to the same way as that in the first embodiment. In the program diagram shown in FIG. 7, the camera-shake limit electronic-charge accumulation-time Q can be set to a point contained on one of the line segments of the optimum exposure values Ev=6 to Ev=12, and in the example of FIG. 7, the camera-shake limit electronic-charge accumulation-time Q is set to a point contained on the line segment of the optimum exposure values Ev=7. Thus, the program diagram is composed of a horizontal line segment $HL_2$, extending from the set point of the camera-shake limit electronic-charge accumulation-time Q to a low luminance side below the optimum exposure value Ev=7, and a slant line segment $IL_2$, extending from the set point to a high luminance side above the optimum exposure value Ev=7. The horizontal line segment $HL_2$ is definitely determined by determining the set point of the camera-shake limit electronic-charge accumulation-time Q, and the slant line segment $IL_2$ can be arbitrarily drawn from the point of the camera-shake limit electronic-charge accumulation-time Q toward the side of higher luminance.

When the photometry value obtained by turning ON the photometry switch 26 is less than or equal to the optimum exposure value Ev=7, the optimum exposure condition is obtained by changing only the electronic-charge accumulation-time Tv. Accordingly, a warning, which indicates that an image blur may happen because of a camera-shake, can be indicated on the LCD panel 48. Conversely, when the photometry value is greater than or equal to the optimum exposure value Ev=7, the gain of the amplifier 38 and the electronic-charge accumulation-time Tv are determined according to the slant line segment $IL_2$. For example, if the photometry value is the optimum exposure value Ev=11, the gain of the amplifier 38 is an amplification factor corresponding to ISO=200, and the electronic-charge accumulation-time Tv is Ev=8 (i.e., 1/250 (sec)).

As described above, if the camera-shake limit electronic-charge accumulation-time Q is obtained according to a conventional way, it is shorter than 1/60 (sec). Therefore, the set point of the camera-shake limit electronic-charge accumulation-time Q is shifted from the point shown in FIG. 4 to the right side, i.e., the side of a higher luminance, so that a degree of freedom in setting the slant line segment $IL_2$ contained in the program diagram is restricted.

As shown in FIG. 7, the slant line segment $IL_2$ of the program diagram can be substituted with a horizontal line segment $BL_3$ and a vertical line segment $BL_4$, which are broken lines. In this case, when the optimum exposure value Ev is greater than 14 and in the range indicated by the horizontal line segment $BL_3$, the gain of the amplifier 38 is always the minimum amplification factor corresponding to ISO=25, so that the optimum exposure condition can be obtained by controlling only the electronic-charge accumulation-time Tv. Thus, when the gain of the amplifier 38 is set to the minimum amplification factor, since the photography is carried out with a low sensitivity, a picture having less noise can be taken. On the other hand, when the optimum exposure value Ev is from 7 to 12, and is in the range indicated by the vertical line segment $BL_4$, only the gain is changed while the electronic-charge accumulation-time is maintained at the camera-shake limit electronic-charge accumulation-time Tv=6 (i.e., 1/60 (sec)), and therefore, a camera-shake photography is prevented. Note that, from the point of view of preventing camera-shake photography, the bending point can be set to a higher shutter speed in comparison with Tv=6.

In the second embodiment, similarly to the first embodiment, a program diagram as indicated in FIG. 7 is prepared for each of the five focal lengths $f_1$, $f_2$, $f_3$, $f_4$, and $f_5$. Each of the program diagrams is formed as a two-dimensional map which is an AE table (S1, S2, S3, S4, and S5), and stored in the ROM 10a of the system control circuit 10. Therefore, when the release switch 28 is turned ON and a focal length is set, one of the focal lengths ($f_1$, $f_2$, $f_3$, $f_4$, and $f_5$), which is the closest to the set focal length, is selected as the focal length data, and the CCD 30 is exposed with the optimum exposure condition.

Figure 8:
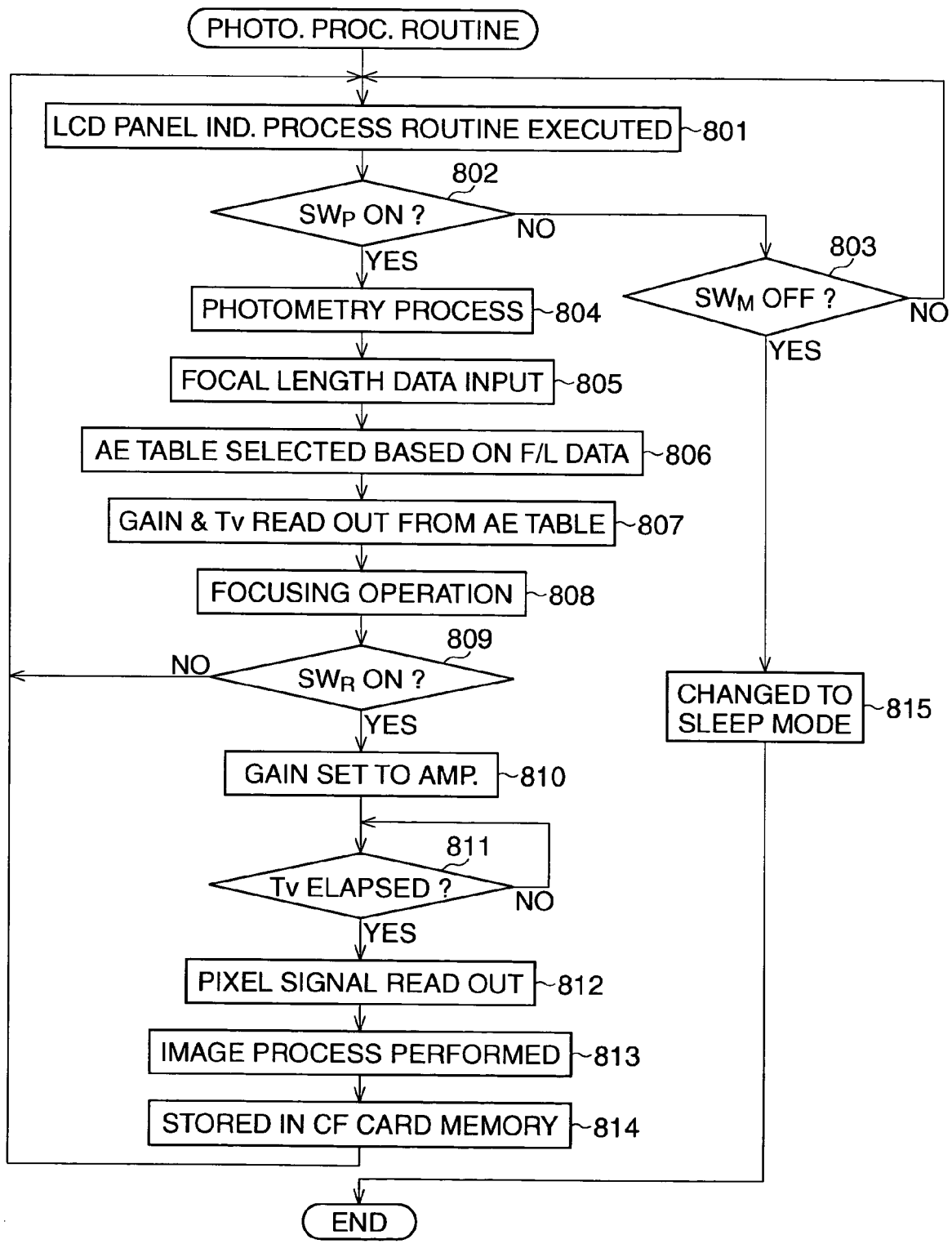
FIG. 8 shows a flowchart of a photographing process routine of the second embodiment.

FIG. 8 shows a flowchart of a photographing process routine executed by the system control circuit 10 shown in FIG. 6. Steps 801 through 815 of FIG. 8 correspond to Steps 501 through 515 of FIG. 5, and both the photographing process routines shown in FIGS. 5 and 8 are substantially the same, except for Steps 807 and 810.

In detail, the gain of the amplifier 38 and the electronic-charge accumulation-time Tv are read from the AE table selected in Step 806, based on the optimum exposure value Ev, in Step 807, while the aperture value Av and the electronic-charge accumulation-time Tv are read from the AE table selected in Step 506, based on the optimum exposure value Ev, in Step 507. Further, the gain, obtained in Step 807, is set to the amplifier 38 and residual electric charge is discharged from the CCD 30 in Step 810, while the aperture 52 is stopped down based on the aperture value Av by driving the aperture drive mechanism 54 and residual electric charge is discharged from the CCD 30 in Step 510.

Note that, in the second embodiment, the gain of the amplifier 38 is controlled in such a manner that a moving picture is indicated with a predetermined brightness on the LCD panel 48, while the LCD panel indication process routine is executed in Step 801.

In the above embodiments, the electronic-charge accumulation-time is controlled using an electronic shutter operated in a solid state imaging device such as a CCD. Conversely, in a case of a digital camera in which a mechanical shutter is assembled similar to a silver halide film camera, the shutter speed is set in order to prevent a camera-shake from occurring, instead of an electronic-charge accumulation-time.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2002-243664 (filed on Aug. 23, 2002) which is expressly incorporated herein, by reference, in its entirety.

The invention claimed is:

1. A digital camera comprising:
  a solid state imaging device that has a light receiving surface, and is provided with an optical low-pass filter;
  a photographing optical system that forms an object image on said light receiving surface through said optical low-pass filter; and
  a storing unit that stores an electronic-charge accumulation-time control program for determining optimum exposure parameters according to which a photography is performed through said photographing optical system and said solid state imaging device, said electronic-charge accumulation-time control program having a program diagram showing a relationship between an electronic-charge accumulation-time and an aperture value and/or an ISO speed, said program diagram having at least one bending point at which said program diagram is bent;
  said electronic-charge accumulation-time T at a bending point which is close to the lowest luminous value of said program diagram satisfying the following formula, when a film-converted pixel pitch p (μm) of said solid state imaging device, which is defined by dividing a width of a photographing film by the number of pixels arranged in a horizontal direction of said light receiving surface, satisfies $4p \geq 60$;

$$1/(f_c \times (60/4p)) \geq T \geq 1/f_c$$

wherein $f_c$ indicates a film-converted focal length (mm), with which, when said light receiving surface is enlarged to an area of said photographing film, said object image is formed on the enlarged area with the same angle of view as that for said photographing film.

2. A digital camera according to claim 1, wherein said photographing optical system comprises an optical-zoom type photographing optical system in which a focal length can be changed, and said electronic-charge accumulation-time control programs are provided for a plurality of focal lengths.

3. A digital camera according to claim 2, further comprising:
  a sensor that senses a focal length set by said optical-zoom type photographing optical system; and
  a selecting processor that selects an electronic-charge accumulation-time control program corresponding to the focal length sensed by said sensor;
  said optimum exposure parameter being determined based on the selected electronic-charge accumulation-time control program.

4. A digital camera according to claim 1, further comprising an aperture that is disposed between said photographing optical system and said solid state imaging device to adjust the amount of light of said object image, and said optimum exposure parameters contains an aperture value of said aperture and said electronic-charge accumulation-time.

5. A digital camera according to claim 1, further comprising an amplifier that amplifies a pixel signal read from said solid state imaging device, and said optimum exposure parameters containing a gain of said amplifier and said electronic-charge accumulation-time.

* * * * *